United States Patent Office 2,710,954
Patented June 14, 1955

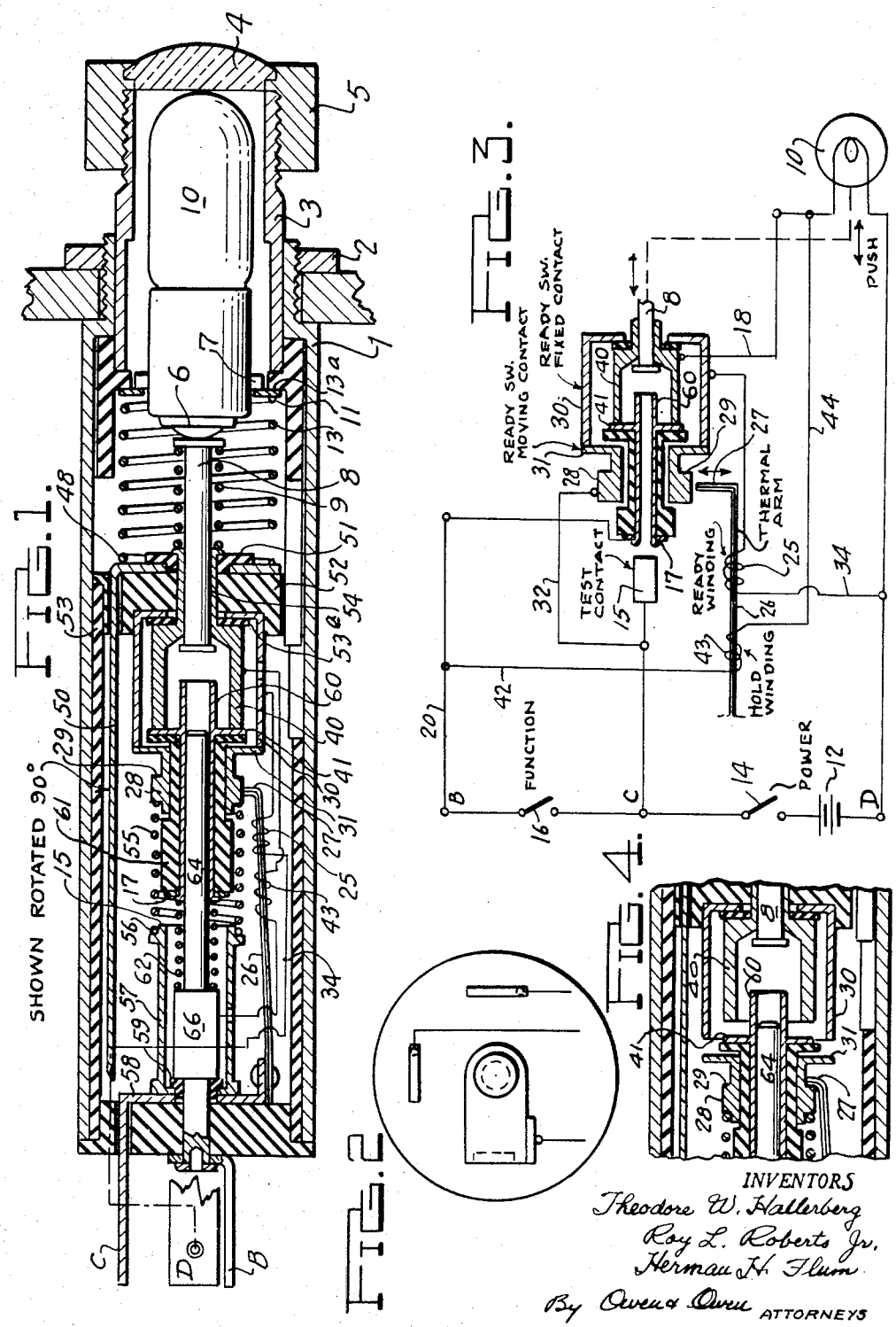

2,710,954

WARNING LIGHT WITH TEST MEANS

Theodore W. Hallerberg, Los Angeles, Roy L. Roberts, Jr., Fullerton, and Herman H. Flum, Southgate, Calif.; said Roberts, Jr. and said Flum assignors to said Hallerberg Application February 25, 1954, Serial No. 412,470

3 Claims. (Cl. 340—252)

This invention relates to warning lights of the type used in aircraft to indicate either a misfunction of a particular apparatus or an omission of a necessary operation. Lights of this character must be of small size and of a high degree of dependability, and preferably must be capable of separate testing apart from the circuit or apparatus being monitored. Devices incorporating the present invention meet these essential requirements and in addition have many advantages over the units known and used at the present time. The primary object of the present invention, therefore, is to improve the reliability and utility of presently known warning or monitoring lights.

Another object of the invention is to provide an improved monitoring light that will not fail to give a signal in the event of failure of any of its more frangible components apart from the lamp itself.

Another object of the invention is to provide a device that will give a bright warning signal which can be reduced to a dim signal by the operator by a simple striking or pushing movement of an exposed portion of the unit, but which will be automatically reset to give a bright signal if a new condition arises after the first trouble or monitored condition has been cleared.

Warning lights of the type with which the present invention are concerned are used in aircraft that must be flown successively on either day or night flights and perhaps by different crews. It is well known that a warning light that is of sufficient brilliance to alert an observer at night may be too dim for daytime use, and that a light of the intensity required for daytime warning may be of blinding brilliance at night. For this reason warning lights are frequently made adjustable so that the operator can, during the test procedure prior to take-off, adjust the intensity with which his warning lights will burn if any warning is given during the flight. The pre-flight procedure may call for testing of all warning lights, but if this is omitted for any reason and the lights have been set for a low brilliance by a previous operator it is readily apparent that they may be too dim for a subsequent daytime use. The present invention, therefore, incorporates a reset device by which any previously established "dim" adjustment will be cancelled when the flight is over and the power turned off so that the initial burning of the warning light will always be bright regardless of whether it had previously been adjusted to the dim position or not.

Briefly, the present invention comprises a combination of elements including a warning lamp, a power source for the lamp, and a "function" circuit which, when closed, will cause the lamp to burn. The warning light is disposed in a casing, a portion of which is exposed so that the operator may move it, for example, in an inwardly axial direction, and within the casing is a latch which includes an electrically energized member that is active whenever a parallel circuit to the power source is closed, and a cooperating member moved with the housing into engagement with the electrically energized latch member. Thus, when the housing is moved by the operator the latch will be closed, and the arrangement is such that the lamp will burn at low intensity thereafter, because power to the lamp is supplied through another parallel circuit including the function switch and the resistance of the electrically energized portion of the latch. If either the function switch or main power switch is thereafter reopened, as at the conclusion of a flight, the latch is released and the parts restored to the original position.

Further advantages and a disclosure of a preferred embodiment of the invention are set forth in the following specification, reference being had to the accompanying drawings in which:

Fig. 1 is a somewhat diagrammatic longitudinal sectional view of a monitor light embodying the present invention;

Fig. 2 is a bottom end view thereof;

Fig. 3 is a circuit diagram with certain parts indicated diagrammatically; and

Fig. 4 is a fragmentary sectional view of certain of the parts standing in the position occupied during a "dim" lamp phase.

Referring first to the circuit diagram of Fig. 3, the present invention includes means for controlling the operation of a warning or monitor lamp 10, the power source for which is shown as comprising a battery 12. A power switch 14 is in circuit with the battery 12, and a function switch 16 is connected to establish a parallel circuit as hereinafter described.

The function switch 16 is a normally open circuit controlling means that is capable of closing an electric circuit upon the occurrence of a predetermined condition. For example, the switch may be closed if engine temperature exceeds a predetermined maximum, or if a hydraulic pressure falls below a predetermined minimum. It is apparent that of the many devices and conditions required to be monitored nearly all of them can be arranged to close an electric circuit upon occurrence of an abnormality or an omission.

Prior to closing of the function switch no current flows to the lamp 10. However a testing circuit is provided by which the lamp circuit may be temporarily closed by the operator merely to establish the fact that the lamp and its associated parts are in operating condition, ready to give an indication should the function switch close. This test circuit includes a stationary contact 15 and a movable contact 17 that may be brought together by pressing inwardly on an extension of the light assembly that protrudes from the instrument panel where it is accessible to the operator. When contacts 15 and 17 are closed, the circuit to the lamp as indicated in Fig. 3 is; from battery 12, power switch 14, junction C, to contact 15, contact 17, through lead 18, to lamp 10 and back via junction D to battery 10. As will be hereinafter described in conjunction with Fig. 1, lead 18 and the described junction points take a different physical form from that shown in Fig. 3 where the circuit is diagrammed for clarity.

As soon as the power switch 14 is closed, a parallel circuit around the lamp is established through a coil 25 designated as a "ready winding" wound over a thermally deformable bimetallic arm 26 fixed within the casing of the warning device. The resistance of coil 25 is such that the heat emanating therefrom causes the bimetallic arm 26 to assume a position such that a hook-like end 27 thereof can act as a detent in cooperation with another latch member 28 by engagement with a shoulder 29 over which the hook-like end 27 of the arm 26 will be engaged when the member 28 is moved inwardly by the operator. The circuit to the ready winding 25 includes a pair of relatively movable contacts that are normally closed to complete the circuit, but are movable to open position whenever the operator desires. In Fig. 3 the contacts in the circuit to the ready winding are shown as a stationary contact 30 and a movable contact 31 formed as a properly dimensioned lateral flange extending from the latch member 28 and connected electrically by lead 32 to junction C and power switch 14. The ready winding 25 is electrically connected between the stationary contact 30 and junction D by means of lead 34. Thus, when the power switch 14 is first closed, current flows from battery 12 to junction C, through lead 32, body 28, movable contact 31, fixed contact 30, the ready winding 25, lead 34, junction D and back to the battery. Since this circuit is in parallel with the lamp it does not affect its operation in any way. The circuit is opened, of course, whenever contacts 30 and 31 are opened and this occurs when the operator or pilot wishes to dim the display of the lamp 10, or when the parts are otherwise separated as when the lamp 10 is tested by the operator.

The present invention provides an initially "bright" display of lamp 10 when the function switch 16 is closed. This circuit is as follows: From battery 12, through power switch 14, past junction C, through function switch 16, junction B, connection 20, contact 17, closed contacts 40—41 (to be described), lead 18, to lamp 10 and back to battery 12. It will be noted that there are no resistive devices, adjustable or otherwise, in this circuit so that the lamp 10 burns at full brilliance.

A second internal switch is formed by contacts 40 and 41 within the housing and is opened by the same movement that opens the ready switch formed by contacts 30 and 31. This second switch 40—41 is in the "bright" circuit above described and is diagrammatically indicated in Fig. 3, and the stationary contact member thereof is connected by lead 18 to the lamp while the movable contact member is connected to lead 20 and junction C so that it receives energy whenever the function switch 16 is closed.

A parallel "dim" circuit to the lamp around the bright circuit above described includes a lead 42, a second resistance winding 43 around the bimetallic arm 26 and a lead 44 to the lamp from the said winding 43. The resistance of the winding 43 is such that the arm 26 will be held in a latched position with its hook end 27 over the shoulder 29 of member 28 by the heat from this winding alone should the circuit to the ready winding 25 be opened as above described. For this reason winding 43 is designated as a "hold" winding. The resistance of the winding being in series with the lamp 10, the lamp will glow with a subdued brilliance whenever the circuit thereto is completed only through the hold winding and by reason of the function switch being closed.

Prior to describing the preferred form of the various elements so far described, which form is shown in Fig. 1, the operation will be described.

In its preferred use, the present invention is incorporated in the monitoring system of airplanes. In such systems regulations require that each monitor light be tested prior to take-off. The present invention so orients the elements that this testing is done by pressing a small ring surrounding the lamp being tested, and is for the obvious purpose that the condition of the lamp should be known to the operator before take-off.

When the main power switch 14 is closed, the ready winding 25 immediately begins to heat up and the bimetallic arm 26 is deformed to move against the body 28. When the operator presses down on the aforementioned ring he completes a circuit between test contacts 15 and 17 and thus establishes a circuit through lamp 10 and the battery 12. If the lamp is in operating condition it will glow at full brilliance. Unless the testing has taken place before the arm 26 has had an opportunity to deform, which would be only immediately after closing of the power switch 14, the end 27 of the arm 26 will hook over the shoulder 29 of the block 28 and will retain the block depressed thus breaking the contact between fixed contact 30 and moving contact 31 which are in circuit with the winding 25. The winding will thus cool and after a short period the bimetallic arm 26 will release the body 28 and permit re-establishment of the circuit through the ready winding. The ready winding then again begins to heat up but the hook end of the arm 26 will move over only against the body 28 and be in position to move over the shoulder should the operator again depress the lamp.

It has been assumed so far that the function switch 16 is open. If during the flight a monitored function occurs the function switch 16 will close and will complete two parallel circuits. The first is through lead 20, moving contact 41, stationary contact 40, lead 18 through the lamp 10 and back to the battery which will cause the lamp 10 to glow at full brilliance. The second circuit is through lead 20, lead 42, the hold winding 43 and lead 44 to the lamp 40. Being of higher resistance the current flow in this circuit is very low so long as the first circuit is closed. If the operator thereafter depresses the rim of the unit to dim the display, the hook end of the arm 26 will move in over the shoulder 29 and retain it in its depressed position. Even though the circuit through the ready winding is broken by this movement, the arm will remain deformed by reason of the heat supplied from the hold winding 43 alone, since the current flow therethrough becomes quite substantial as soon as its low resistance parallel circuit is opened. Movement of the sliding body member breaks not only the contact between parts 30 and 31 but also opens the contacts between 40 and 41 as indicated in Fig. 4. Thus the only circuit through the lamp is through the hold winding and the resistance of this winding causes the lamp to glow at a subdued brilliance.

After the function switch 16 is opened as by correction of the misfunction that has been monitored, the hold winding becomes cool by reason of the fact that no current thereafter flows through it and the arm 26 assumes its undeformed position, and the ready winding again begins to heat up the arm since contacts 30—31 are again closed.

After completion of the flight the power switch 14 is opened and no current will flow either through the ready winding 25 or the hold winding 43. The device is thus positioned so that contacts 30 and 31 and 40 and 41 are again closed and any dim setting that might have been held over from the previous flight is cancelled.

Having described the schematic and diagrammatic disclosure of the invention, reference will now be made to Fig. 1 which shows a central longitudinal sectional view, somewhat enlarged, of an actual embodiment. As there shown the device is housed in a casing 1 which may be conveniently threaded at its outer end for attachment to a bulkhead between a shouldered portion of the casing 1 and a gland nut 2. Within the outer portion of the casing there is disposed a cylindrical driver body 3 mounted for free reciprocating movement and having a front cylindrical extension extending from the casing to receive a lens 4 and lens holder ring 5 which may be conveniently unscrewed in the event that a lamp is to be replaced. The lamp contacts are the usual center contact 6 and shell contact 7 and connections to each are made by spring pressed connectors. In the case of the center lamp contact 6 the connector is in the form of a rod-like member 8, pressed outwardly by spring 9 and in the case of the shell contact 7 the connector is in the form of a ring 11 biased upwardly by a spring 13, but limited in its outward movements by a shoulder 13a on the reciprocable portion 3 of the lamp holder. In the form shown the lamp is pressed inwardly by the engagement of its outer end with the lens 4 and the threaded ring 5 is tightened until the lamp contacts 6 and 7 are made against their respective connectors.

The ring-like connector 11 is at the potential of one side of battery 12, spring 13 bearing against the internal end 48 of a contact bar 50 that extends out of the housing to become a terminal to which connection to one side of the battery is established. In the circuit diagram this terminal is designated D. In the diagrammatic Fig. 1 it is necessary to show the contact bar 50 in a position rotated 90° from the position in which it would actually occupy, otherwise the entire bar would be hidden by the remaining structure within the housing. A legend to this effect has therefore been added to Fig. 1.

The inturned portion 48 is insulated from the center rod contact 8 and its biasing spring 9 by an insulating grommet 51.

A center insulating partition 52 carried across the interior of the housing 1 and resting over the inner end of a tubular insulating liner 53 serves as a support for the various stationary contact members hereinafter described. At the lower, or outer side of the partition 52 there are mounted concentric contact members 30 and 40 insulated from each other by a small insulating disk 53a. The inner contact member 40 is provided with a hollow stem 54 that extends through an opening in disk 53a, through the partition 52, through an opening in the inturned contact member 48 and through the grommet 51 where it is upset to clamp the parts in position with respect to each other and to the partition. The stem is made hollow to receive the rod-like connector member 8 and to guide it in its reciprocating movements imparted thereto when the operator presses the ring 5 at the exposed outer end of the housing.

The outer concentric contact 30 is also held in place by the clamping action of the contact 40 against the insulating partition. This contact cooperates with a movable contact 31 which may be conveniently formed as a flange on the body 28 and which is biased upwardly against contact 30 by a spring 55 the outer end of which bears against a shoulder 56 of a tubular metallic element 57 which in turn is clamped against a laterally extending portion 58 of a terminal C by, for example, the shoulder of an insulating disk 59. Thus the tube 57, spring 55, body 28 and the flange-like contact 31 are all at the potential of terminal C. It will be noted that the outer concentric contact 30 is connected electrically to the ready winding 25 and that a suitable connection is made from the opposite end of the ready winding by lead 34 to terminal 50 which is at the potential of junction D in the circuit diagram, Fig. 3.

The inner concentric contact 40 cooperates with a movable contact 41 which is preferably formed as a shoulder or flange extending from a tubular metallic body 60 within body 28 and insulated therefrom by a tubular insulating member 61. The tubular body 60 carries a small plate contact at its outer end which forms the movable test contact 17, and the test contact and insulation are held in place by turning over the end of the body 60 to clamp the parts between the turned over portion and the lower face of the contact shoulder or flange 41. The assembly thus formed is biased inwardly toward the position in which contacts 40 and 41 are closed by a spring 62, and the assembly is guided for reciprocation over a rod 64 which enters the tubular body 60 and which extends out of the base of the unit where it is riveted over terminal B, to clamp the terminal in place with respect to the base. The rod 64 is provided with an enlargement 66 between its ends, one end of the enlargement bearing against the small insulating disk 59 and the other end serving as a supporting shoulder for spring 62. It will thus be seen that the rod 64, tubular body 60, and the contact 41 are all at the potential of terminal B.

In operation, the test circuit is closed when the operator pushes inwardly on the ring 5, moving the body 3 inwardly with respect to the stationary housing 1. This moves the lamp 10 and its center contact 6 inwardly and the end of the contact stem 8 abuts against the tubular body 60 so that continued inward movement of the rod contact and body is made with an electrical contact between the parts. The tubular body 60 is thus moved by the operator until the plate contact 17 comes up against the stationary contact 15 which is constituted by the upper end of the tubular contact member 57. The lamp contact 6 is thus brought to the potential of terminal B and connected to the battery, provided the power switch 14 is closed. If the lamp is in operating condition it will burn at full brilliance as a result of closing the test circuit between contacts 15 and 17.

If the power switch 14 has been closed for an appreciable period of time before the above described lamp testing operation takes place, the ready winding 25 will have had current flowing therein and will have become heated sufficiently to deform the thermal arm 26 and bend it inwardly. Thus the latching hook 27 may move in over the shoulder 29 on body 28 and keep the body from returning to its initial position after the operator releases his pressure on ring 5 applied during the testing operation. The parts would then return only to the position shown in Fig. 4 in which contacts 30 and 31 stand open. The ready winding circuit would then be broken at this point and the arm 26 would start to cool off. As soon as the arm has cooled sufficiently, the latching hook 27 will move away from the shoulder 29 and release the body 28 and permit it to return to the position in which switches 30—31 and 40—41 are closed (as shown in Fig. 1). This recloses the circuit to the ready winding and the arm 26 will again be heated, but the hook 27 will simply bear against the body 28, ready to move in over the shoulder 29, upon a subsequent depressing movement as hereinafter described.

If the function switch 16 should close, the lamp 10 will burn at full brilliance, the circuit being as described above. If the operator notes the signal thus given and finds the intensity of the lamp to be disturbingly high, he can dim it by pushing in on the ring 5 to depress the parts sufficiently for the thermal arm hook 27 to move in over shoulder 29. By so doing he breaks the "bright" circuit by opening switch 40—41. The hook 27 snaps in over the shoulder 29 and holds the switch contacts separated and in the position shown in Fig. 4. The dim circuit which includes the resistance of the hold winding 43 is thereafter effective and remains so either until function switch 16 opens due to correction of the condition that caused it to close, or until the power switch 14 is opened at the end of the flight.

If for any reason the circuits to the ready winding 25 or to the hold winding 43 are broken, or if the thermal arm 26 should break or be rendered otherwise inoperative, the only result would be the inability of the operator to dim the signal given upon closure of the function switch 16. There is no wiring within the unit that can fail in such a way that no indication will be given should the function switch close.

While the invention has been described in conjunction with a specific form and disposition of the parts it should be understood that various modifications and changes may be made therein without departing from the scope of the appended claims.

What we claim is:

1. In a warning light for periodic use in aircraft and the like, a lamp, an electric power source, means including a function switch to establish a warning circuit from said power source through said lamp whenever a predetermined condition exists against which a warning is to be displayed, a housing for said lamp having a movable portion, a latch comprising a first member movable by said movable housing portion, and a cooperating member including electrically energized means to bias said cooperating latch member toward latching engagement with said first latch member, means to establish a parallel circuit from said power source through said electrically energized means, means to open said parallel circuit by movement of said movable housing portion, and means in series in said lamp circuit to hold said electrically energized means in a biased condition whereby said latch will remain engaged after movement of said movable housing portion but will be released upon opening of said function switch and said parallel circuit.

2. In a warning light for periodic use in aircraft and the like, a lamp, an electric power source, means including a function switch to establish a warning circuit from said power source through said lamp whenever a predetermined condition exists against which a warning is to be displayed, a housing for said lamp having a movable portion, a latch comprising a first member movable by said movable housing portion, and a cooperating member including electrically energized means to bias said cooperating latch member toward latching engagement with said first latch member, means to establish a parallel circuit from said power source through said electrically energized means, means to open said parallel circuit by movement of said movable housing portion, a second circuit from said power source to said lamp in parallel with said warning circuit and including a resistance in series with said lamp to hold said electrically energized means in biased condition whereby said latch will remain engaged after movement of said movable housing portion but will be released upon opening of said function switch and said parallel circuit.

3. In a warning light for periodic use in aircraft and the like, a lamp, an electric power source, means including a function switch to establish a warning circuit from said power source through said lamp whenever a predetermined condition exists against which a warning is to be displayed, a housing for said lamp having a movable portion, a latch comprising a first member movable by said movable housing portion, and a cooperating member including electrically energized means to bias said cooperating latch member toward latching engagement with said first latch member, means to establish a parallel circuit from said power source through said electrically energized means, means to open said parallel circuit by movement of said movable housing portion, means to open said warning circuit by movement of said movable housing portion, and a second warning circuit from said power source to said lamp in parallel with said first warning circuit and including a resistance in series with said lamp and acting to hold said electrically energized means in biased condition only so long as said function switch is closed, whereby said lamp burns bright upon closing of said function switch and burns dim upon closing said second warning circuit and opening said first warning circuit.

No references cited.